United States Patent
Yamamoto et al.

(10) Patent No.: US 10,324,523 B2
(45) Date of Patent: Jun. 18, 2019

(54) RENDERING VIRTUAL IMAGES BASED ON PREDICTED HEAD POSTURE

(71) Applicant: Sony Corporation, Tokyo (JP)

(72) Inventors: Yuki Yamamoto, Chiba (JP); Kenta Kawamoto, Tokyo (JP); Yoichi Hirota, Kanagawa (JP)

(73) Assignee: Sony Corporation (JP)

( * ) Notice: Subject to any disclaimer, the term of this patent is extended or adjusted under 35 U.S.C. 154(b) by 179 days.

(21) Appl. No.: 15/026,766

(22) PCT Filed: Nov. 4, 2014

(86) PCT No.: PCT/JP2014/079205
§ 371 (c)(1),
(2) Date: Apr. 1, 2016

(87) PCT Pub. No.: WO2015/098292
PCT Pub. Date: Jul. 2, 2015

(65) Prior Publication Data
US 2016/0252955 A1  Sep. 1, 2016

(30) Foreign Application Priority Data
Dec. 25, 2013  (JP) ................. 2013-268014

(51) Int. Cl.
*G06F 3/01* (2006.01)
*H04N 5/74* (2006.01)
(Continued)

(52) U.S. Cl.
CPC .............. *G06F 3/012* (2013.01); *G06F 3/011* (2013.01); *G06F 3/0346* (2013.01); *G06T 11/00* (2013.01);
(Continued)

(58) Field of Classification Search
None
See application file for complete search history.

(56) References Cited

U.S. PATENT DOCUMENTS 5,615,132 A * 3/1997 Horton .................. G06F 3/011
340/988
5,933,125 A  8/1999 Fernie et al.
(Continued)

FOREIGN PATENT DOCUMENTS

JP  HEI 02301798  12/1990
JP  HEI 08336128  12/1996
(Continued)

OTHER PUBLICATIONS

International Search Report from International Publication PCT/JP2014/079205 dated Feb. 10, 2015.

*Primary Examiner* — Hilina K Demeter
(74) *Attorney, Agent, or Firm* — Lerner, David, Littenberg, Krumholz & Mentlik, LLP

(57) ABSTRACT

An image following a movement of a head of a user who observes an image is generated.
At a drawing device 300, posture angle data to be received at a certain time after a time series of posture angle data that have already been received are predicted, and rendering processing is performed on an image based on the predicted posture angle data. A prediction algorithm for the posture angle data is roughly divided into two steps: (1) estimating a predicted time to receive the posture angle data; and (2) predicting the posture angle data at the predicted time. By rendering the image at the predicted time from the predicted posture angle data, a sense of delay felt when the image following the movement of the head of the user is presented is reduced.

16 Claims, 10 Drawing Sheets

(51) Int. Cl.

| | |
|---|---|
| *G06F 3/0346* | (2013.01) |
| *G06T 11/20* | (2006.01) |
| *G06T 11/80* | (2006.01) |
| *G06T 11/00* | (2006.01) |
| *H04N 5/14* | (2006.01) |
| *G02B 27/01* | (2006.01) |
| *G02B 27/00* | (2006.01) |

(52) U.S. Cl.
CPC .............. *G06T 11/20* (2013.01); *G06T 11/80* (2013.01); *H04N 5/74* (2013.01); *G02B 27/0093* (2013.01); *G02B 2027/0187* (2013.01); *H04N 5/145* (2013.01)

(56) References Cited

U.S. PATENT DOCUMENTS

| | | | | |
|---|---|---|---|---|
| 2004/0051680 | A1* | 3/2004 | Azuma | G03B 13/28 345/8 |
| 2011/0066262 | A1* | 3/2011 | Kelly | G05B 23/0267 700/90 |
| 2015/0002542 | A1* | 1/2015 | Chan | G06F 3/048 345/633 |

FOREIGN PATENT DOCUMENTS

| | | |
|---|---|---|
| JP | 09106322 | 4/1997 |
| JP | 2004198377 A | 7/2004 |
| JP | 2004343431 A | 12/2004 |
| JP | 2010039556 A | 2/2010 |
| JP | 2010256534 A | 11/2010 |
| JP | 2011070341 A | 4/2011 |
| JP | 2012141461 A | 7/2012 |
| JP | 2013225245 A | 10/2013 |

* cited by examiner

RENDERING VIRTUAL IMAGES BASED ON PREDICTED HEAD POSTURE

CROSS-REFERENCE TO RELATED APPLICATION

The present application is a national phase entry under 35 U.S.C. § 371 of International Application No. PCT/JP2014/079205 filed Nov. 4, 2014, published on Jul. 2, 2015 as WO 2015/098292 A1, which claims priority from Japanese Patent Application No. 2013-268014, filed in the Japanese Patent Office on Dec. 25, 2013.

TECHNICAL FIELD

A technique disclosed in the present description relates to an image processing device, an image processing method, a computer program, and an image display system for processing an image following a movement of a head of a user.

BACKGROUND ART

An image display device which is fixed to a head or a face of a user who observes an image, that is, a head mounted display, is known. The head mounted display includes, for example, image display units for respective left and right eyes, and is configured to be used together with headphones so as to be capable of controlling visual and auditory senses. When the head mounted display is configured to completely shut out the outside world while being mounted on the head, virtual reality during viewing and listening is enhanced. The head mounted display also enables different videos to be projected on the left and right eyes. Therefore, when images with parallax are displayed for the left and right eyes, a 3D image can be presented.

This kind of head mounted display causes virtual images to be formed on retinas of the eyes and be observed by the user. The virtual image as used herein is formed on an object side of a lens when the object is located at a position close to the lens within a focal length. For example, a head mounted display has been proposed which is configured such that an optical system with a wide viewing angle is arranged in front of pupils at an interval of 25 mm, and a display panel having a size of an effective pixel range of about 0.7 in is further arranged in front of the optical system with the wide viewing angle (for example, refer to Patent Document 1).

By using this kind of head mounted display, a wide angle image can be viewed. For example, a head mounted display has been proposed which is configured such that a head motion tracking device including a gyro sensor or the like is attached to a head so as to allow a user to feel a 360-degree video of a whole space following a movement of the head of the user (for example, refer to Patent Document 2 and Patent Document 3). A displayed region is moved so that the movement of the head detected by the gyro sensor is canceled, whereby the user is allowed to observe an image following the movement of the head of the user and look over the whole space.

It is preferable that the head mounted display presents an image following the movement of the motion of the head of the user with a shorter delay time. A sense of feeling that the image is following the motion of the head is deteriorated by a long delay time. In addition, it is concerned that the user may feel sick.

SUMMARY OF THE INVENTION

Problems to be Solved by the Invention

An object of a technique disclosed in the present description is to provide an excellent image processing device, image processing method, computer program, and image display system capable of suitably processing an image following a movement of a part or all of a body of a user such as a head, an end of a hand, an end of a foot, and a waist.

Solutions to Problems

The present application has been made in consideration of the above-mentioned problem, and a technique described in claim 1 is an image processing device including:

a receiving unit that receives time series data from an external device;

a predicted time calculation unit that calculates a predicted time from a time when the latest one of previously received data is generated in the external device to a time when a next image is displayed;

a time series data prediction unit that predicts time series data at the predicted time; and a drawing processing unit that renders an image based on the time series data predicted by the prediction unit.

According to a technique described in claim 2 of the present application, the time series data prediction unit of the image processing device according to claim 1 includes a configuration to interpolate between two pieces of time series data, and is configured to extrapolate a portion ahead of the two pieces of time series data to predict time series data ahead by the predicted time.

According to a technique described in claim 3 of the present application, the image processing device according to claim 1 further includes a sending unit that sends the rendered image to a display device.

According to a technique described in claim 4 of the present application, the image processing device according to claim 1 further includes a display unit that displays the rendered image.

According to a technique described in claim 5 of the present application, the external device tracks a position or a posture of a part or all of a body of a user who observes an image. In addition, the receiving unit of the image processing device according to claim 1 receives, from the external device, posture information as the time series data, and the drawing processing unit is configured to render, based on the posture information, an image following a movement of a part or all of the body of the user.

According to a technique described in claim 6 of the present application, the predicted time calculation unit of the image processing device according to claim 5 is configured to calculate the predicted time based on a total delay amount from when the posture information is sent from the external device to when an image that is based on the posture information is displayed.

According to a technique described in claim 7 of the present application, in the image processing device according to claim 6, the total delay amount includes a transmission delay that occurs when the posture information is transmitted from the external device, a rendering delay that occurs when the image is rendered based on the posture information, and a display delay that occurs when the rendered image is displayed.

According to a technique described in claim 8 of the present application, the predicted time calculation unit of the image processing device according to claim 6 is configured to divide the total delay amount into a constant delay that is measurable and a variant delay that is unmeasurable to calculate the total delay amount.

According to a technique described in claim 9 of the present application, in the image processing device according to claim 8, the variant delay includes a variation in a transmission delay.

According to a technique described in claim 10 of the present application, the receiving unit of the image processing device according to claim 5 is configured to receive, from the external device, a quaternion representing the position or the posture of a part or all of the body of the user as the time series data.

According to a technique described in claim 11 of the present application, the time series data prediction unit of the image processing device according to claim 10 includes a configuration to perform a linear interpolation on two quaternions, and is configured to extrapolate a portion ahead of the two quaternions to predict a quaternion ahead by the predicted time.

According to a technique described in claim 12 of the present application, the time series data prediction unit of the image processing device according to claim 10 includes a configuration to perform a spherical linear interpolation on two quaternions, and is configured to extrapolate a portion ahead of the two quaternions to predict a quaternion ahead by the predicted time.

In addition, a technique described in claim 13 of the present application is an image processing device including:

a receiving unit that receives time series data from an external device;

a predicted time calculation unit that calculates a predicted time from a time added, in the external device, to the latest one of previously received data to a time when a next image is displayed;

a time series data prediction unit that predicts time series data at the predicted time; and a drawing processing unit that renders an image based on the time series data predicted by the prediction unit.

Moreover, a technique described in claim 14 of the present application is an image processing device including:

a receiving unit that receives time series data from an external device;

a predicted time calculation unit that calculates a predicted time from the latest time of sending previously received data from the external device to a time when a next image is displayed;

a time series data prediction unit that predicts time series data at the predicted time; and a drawing processing unit that renders an image based on the time series data predicted by the prediction unit.

Furthermore, a technique described in claim 15 of the present application is an image processing method including:

a receiving step of receiving time series data from an external device;

a predicted time calculation step of calculating a predicted time from a time when the latest one of previously received data is generated in the external device to a time when a next image is displayed;

a time series data prediction step of predicting time series data at the predicted time; and a drawing processing step of rendering an image based on the time series data predicted in the prediction step.

In addition, a technique described in claim 16 of the present application is a computer program described in a computer-readable form so as to cause a computer to function as:

a receiving unit that receives time series data from an external device;

a predicted time calculation unit that calculates a predicted time from a time when the latest one of previously received data is generated in the external device to a time when a next image is displayed;

a time series data prediction unit that predicts time series data at the predicted time; and a drawing processing unit that renders an image based on the time series data predicted by the prediction unit.

The computer program according to claim 16 of the present application defines a computer program described in a computer-readable form so as to realize predetermined processing on a computer. In other words, by installing the computer program according to claim 16 of the present application on a computer, a cooperative effect is exhibited on the computer, whereby a working effect similar to that of the image processing device according to claim 1 of the present application can be obtained.

Moreover, a technique described in claim 17 of the present application is an image display system including:

an external device that sends time series data;

a drawing device that receives the time series data and renders an image; and a display device that displays the image rendered by the drawing device, wherein the drawing device predicts a predicted time from a time when the latest one of previously received data is generated in the external device to a time when a next image is displayed, predicts time series data at the predicted time, and renders the image based on the predicted time series data.

The "system" as used herein refers to a logical collection of a plurality of devices (or function modules that realize specific functions), and there is no particular requirement as to whether each device or function module is in a single housing.

According to a technique described in claim 18 of the present application, in the image display system according to claim 17, the external device is a tracking device that tracks a position or a posture of a part or all of a body of a user who observes a display image on the display unit, and sends posture information, and the drawing device is configured to render, based on the received posture information, an image following a movement of a part or all of the body of the user.

According to a technique described in claim 19 of the present application, in the image display system according to claim 17, the tracking device sends a quaternion representing a position or a posture of a part or all of a body of a user, and the drawing device is configured to predict a quaternion ahead by the predicted time by extrapolating a portion ahead of two quaternions to perform a spherical linear interpolation on the two quaternions, and to render the image based on the predicted quaternion.

Effects of the Invention

According to a technique disclosed in the present description, it is possible to provide an excellent image processing device, image processing method, computer program, and image display system capable of suitably processing an image following a movement of a part or all of a body of a user such as a head, an end of a hand, an end of a foot, and a waist.

There are variations in a delay amount when posture information indicating the movement of the head or the like of the user is transmitted. According to the technique disclosed in the present description, posture information at a certain time after a time series of the posture information having variations in a transmission delay is predicted, and rendering processing is performed on an image based on the predicted posture information. Consequently, a sense of delay felt when the user observes the image following the movement of the head can be reduced.

The effects described in the present description are only examples, and the effects of the present invention are not limited to these effects. The present invention may provide further additional effects in addition to the above-mentioned effects.

Further another object, characteristic, and advantage of the technique disclosed in the present description will be clarified by an embodiment described later and a more detailed description based on the accompanying drawings.

MODE FOR CARRYING OUT THE INVENTION

Hereinafter, an embodiment of a technique disclosed in the present description will be described with reference to the accompanying drawings.

Figure 1:
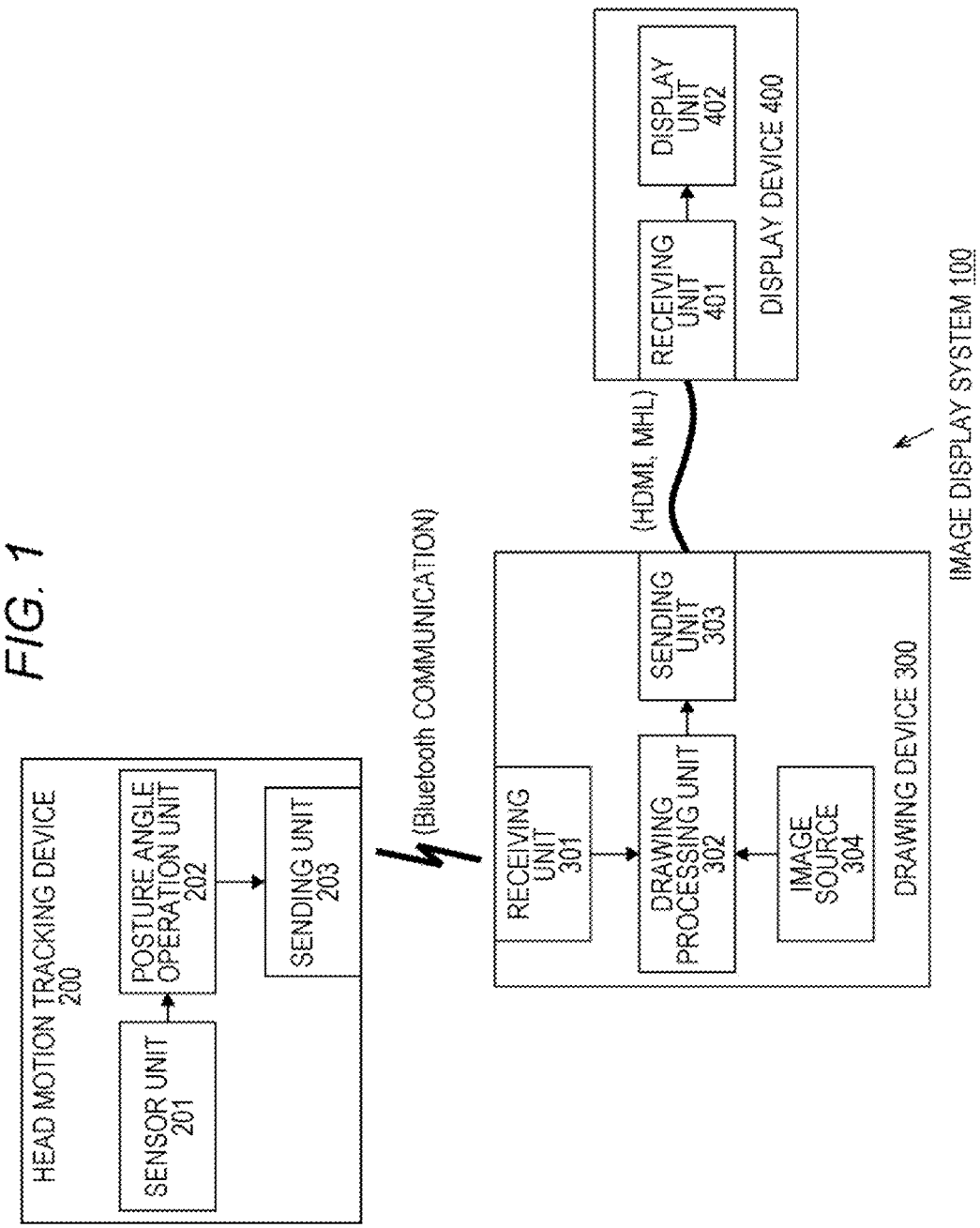
FIG. 1 is a diagram schematically illustrating an exemplary configuration of an image display system 100 to which a technique disclosed in the present description is applied.

An exemplary configuration of an image display system 100 to which the technique disclosed in the present description is applied is schematically illustrated in FIG. 1. The illustrated image display system 100 includes a head motion tracking device 200, a drawing device 300, and a display device 400.

The head motion tracking device 200 is used by being mounted on a head of a user who observes an image displayed by the display device 400. The head motion tracking device 200 outputs, to the drawing device 300, a posture angle of the head of the user at a predetermined sending period. In the illustrated example, the head motion tracking device 200 includes a sensor unit 201, a posture angle operation unit 202 and a sending unit 203 that sends obtained posture information to the drawing device 300.

The sensor unit 201 is configured by combining a plurality of sensor elements such as, for example, a gyro sensor, an acceleration sensor, and a geomagnetic sensor. The sensor unit 201 as used herein is a sensor capable of detecting nine axes in total by including a triaxial gyro sensor, a triaxial acceleration sensor, and a triaxial geomagnetic sensor.

Figure 9:
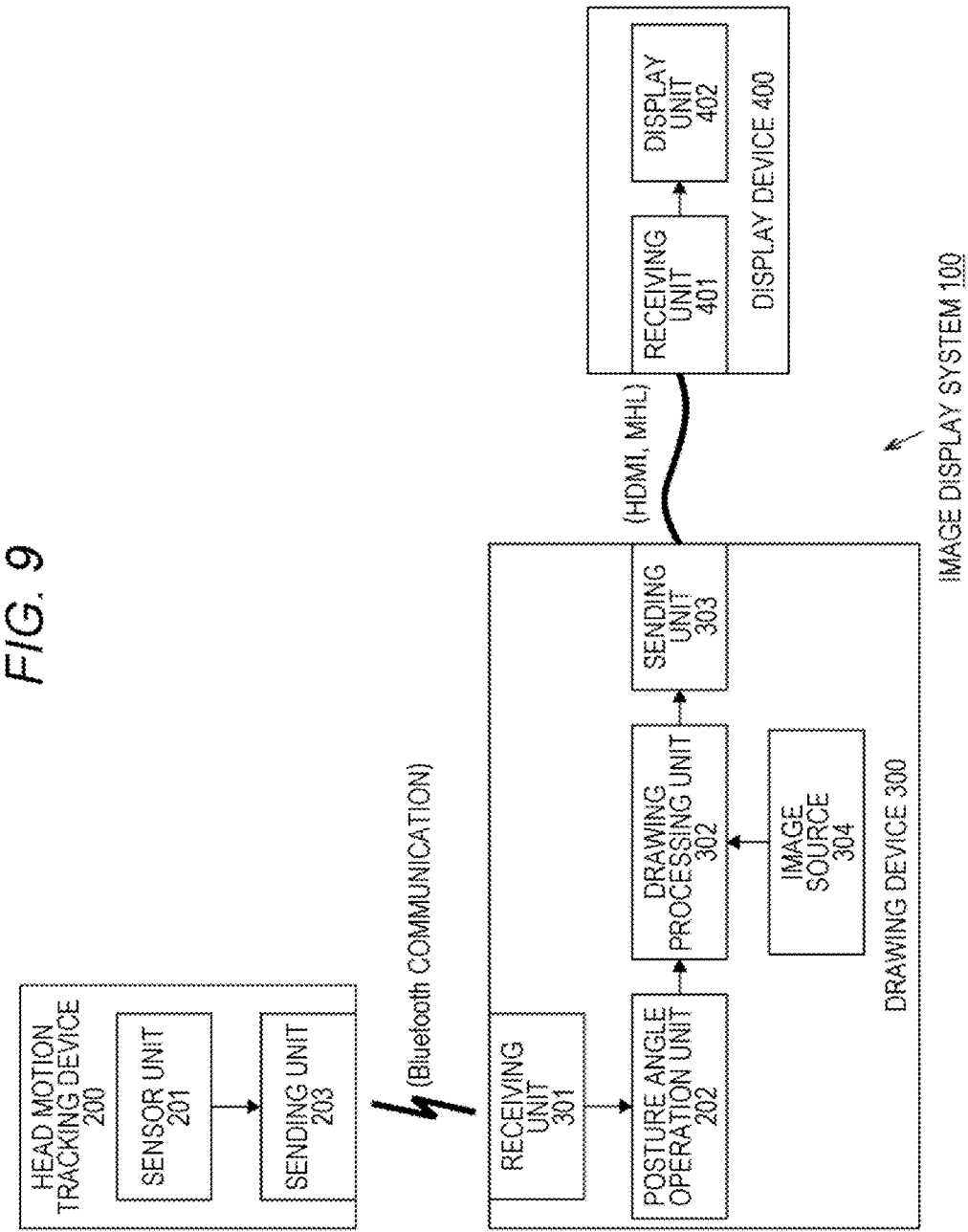
FIG. 9 is a diagram illustrating a variation of the image display system 100.

The posture angle operation unit 202 operates the posture angle of the head of the user based on a detection result of the nine axes by the sensor unit 201. The sending unit 203 sends the requested posture information to the drawing device 300. In the present embodiment, the posture angle is represented as a quaternion. The quaternion is a quaternion including a rotation axis (vector) and a rotation angle (scalar). However, the head motion tracking device 200 does not necessarily operate the posture angle represented by the quaternion. The head motion tracking device 200 may send, to the drawing device 300, information representing the posture angle in a form different from the quaternion. Alternatively, as illustrated in FIG. 9, the head motion tracking device 200 may output, from the sending unit 203, the detection result of the sensor unit 201 as it is, and the drawing device 300 may be equipped with the posture angle operation unit 202 to calculate the posture angle from the sensor information received from the head motion tracking device 200.

In the illustrated image display system 100, the head motion tracking device 200 and the drawing device 300 are coupled to each other by wireless communication such as Bluetooth (registered trademark) communication. It is assumed in the present embodiment that the head motion tracking device 200 and the drawing device 300 asynchronously communicate with each other, and clocks of both devices are also not synchronized with each other. Needless to say, the head motion tracking device 200 and the drawing device 300 may be coupled to each other via a high-speed wired interface such as a universal serial bus (USB) instead of the wireless communication. In either case, a transmission delay occurs when the posture information is transmitted from the head motion tracking device 200 to the drawing device 300.

Due to a characteristic that the Bluetooth (registered trademark) communication is used for communication of various devices, a protocol is designed for each type of device and standardized as a profile. For example, a serial port profile (SPP) is a profile for virtual serial communication between devices conforming to the Bluetooth (registered trademark), and also used for connecting a terminal equipped with Android (registered trademark) such as a smartphone to the device conforming to the Bluetooth (registered trademark). The SPP ranges in sampling rate and easily generates an irregular delay.

The drawing device 300 performs rendering processing for the image to be displayed on the display device 400. The drawing device 300 is configured as, for example, a terminal equipped with the Android (registered trademark) such as a smartphone, or configured as a personal computer or a game machine. However, the drawing device 300 is not limited to these devices.

In the illustrated example, the drawing device 300 includes a receiving unit 301, a drawing processing unit 302, a sending unit 302, and an image source 304. The receiving unit 301 receives the posture information from the head motion tracking device 200. The drawing processing unit 302 performs the rendering processing for the image based on the posture information. The sending unit 302 sends the rendered image to the display device 400. The image source 304 serves as a supply source of the image data.

The receiving unit 301 receives the posture information from the head motion tracking device 200 via the Bluetooth (registered trademark) communication or the like. As mentioned above, the posture information is represented by the quaternion.

The image source 304 includes, for example, a media reproducing device, a broadcast tuner, and a communication interface or the like. The media reproducing device reproduces a recording medium such as Blu-ray (registered trademark). The broadcast tuner selects and receives a digital broadcast signal. The communication interface receives image content from a server of the Internet or the like.

The drawing processing unit 302 renders, from the image data of the image source 304, the image to be displayed at the display device 400. For example, the drawing processing unit 302 renders, from an entire spherical original image or a high-resolution (e.g. 4K) original image supplied from the image source 304, an image that is a partial region segmented from the original image and corresponding to the posture information received at the receiving unit 301.

The drawing device 300 and the display device 400 are coupled to each other by, for example, a wired cable such as a high definition multimedia interface (HDMI, registered trademark) and a mobile high-definition link (MHL). Alternatively, the drawing device 300 and the display device 400 may be coupled to each other by wireless communication such as wirelessHD and Miracast. Using any of the communication paths, the sending unit 303 sends, to the display device 400, the image data rendered by the drawing processing unit 302 without compression.

The display device 400 includes a receiving unit 401 and a display unit 402. The receiving unit 401 receives the image from the drawing device 300. The display unit 402 displays the received image. The display device 400 is configured as, for example, a head mounted display which is fixed to the head or the face of the user who observes the image.

The receiving unit 401 receives the uncompressed image data from the drawing device 300 via the communication path such as the HDMI (registered trademark) and the MHL. The display unit 402 displays the received image data on a screen.

In a case where the display device 400 is configured as the head mounted display, for example, the display unit 402 includes left and right screens fixed at left and right eyes of the user, respectively, and displays a left eye image and a right eye image. The screen of the display unit 402 includes a display panel such as a microdisplay exemplified by an organic electro-luminescence (EL) element and a liquid crystal display. Alternatively, the screen of the display unit 402 includes a laser scanning display such as a retina direct drawing display. The screen of the display unit 402 also includes a virtual image optical unit that enlarges and projects a display image on the display unit 402 to allow the user to observe the image as an enlarged virtual image of a predetermined angle of view.

The image is rendered at the drawing device 300. Such an image is, for example, a partial region segmented from the entire spherical original image or the high-resolution (e.g. 4K) original image and corresponding to the posture information of the head of the user. At the display device 400, a displayed region within the original image is moved so that the posture angle of the head of the user is canceled. Accordingly, the user is allowed to observe an image following a movement of the head of the user and look over a large screen.

In the example illustrated in FIG. 1, the image display system 100 includes three independent devices, namely the head motion tracking device 200, the drawing device 300, and the display device 400. Alternatively, the image display system 100 may be configured in such a manner that the drawing device 300 and the display device 400 are incorporated in a single device, or the head motion tracking device 200, the drawing device 300, and the display device 400 are all incorporated in a single device. In a case where the head motion tracking device 200 is configured as an optional product externally attached to the display device 400 as illustrated in FIG. 1, the display device 400 is reduced in its size, weight, and cost.

Figure 2:
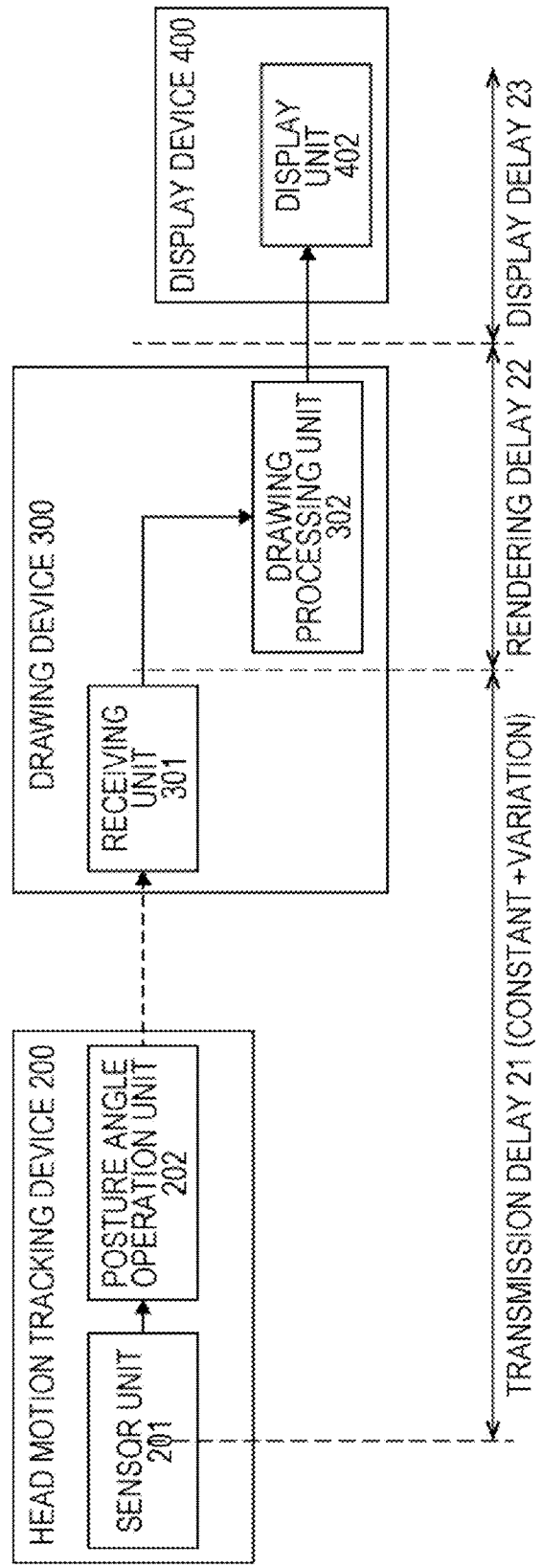
FIG. 2 is a diagram illustrating a delay that occurs when image data following a head motion of a user are displayed in the image display system 100.

In the image display system 100 illustrated in FIG. 1, a delay time occurs between when the head motion tracking device 200 detects the posture of the head of the user and when the display device 400 displays the image following the posture. As illustrated in FIG. 2, a transmission delay 21, a rendering delay 22, and a display delay 23 are considered to be major factors in the delay time. The transmission delay 21 occurs when the posture information is transmitted from the head motion tracking device 200 to the drawing device 300. The rendering delay 22 occurs when the image following the posture information is subjected to the drawing processing at the drawing device 300. The display delay 23 occurs when the drawing data are displayed on the display device 400.

Figure 3:
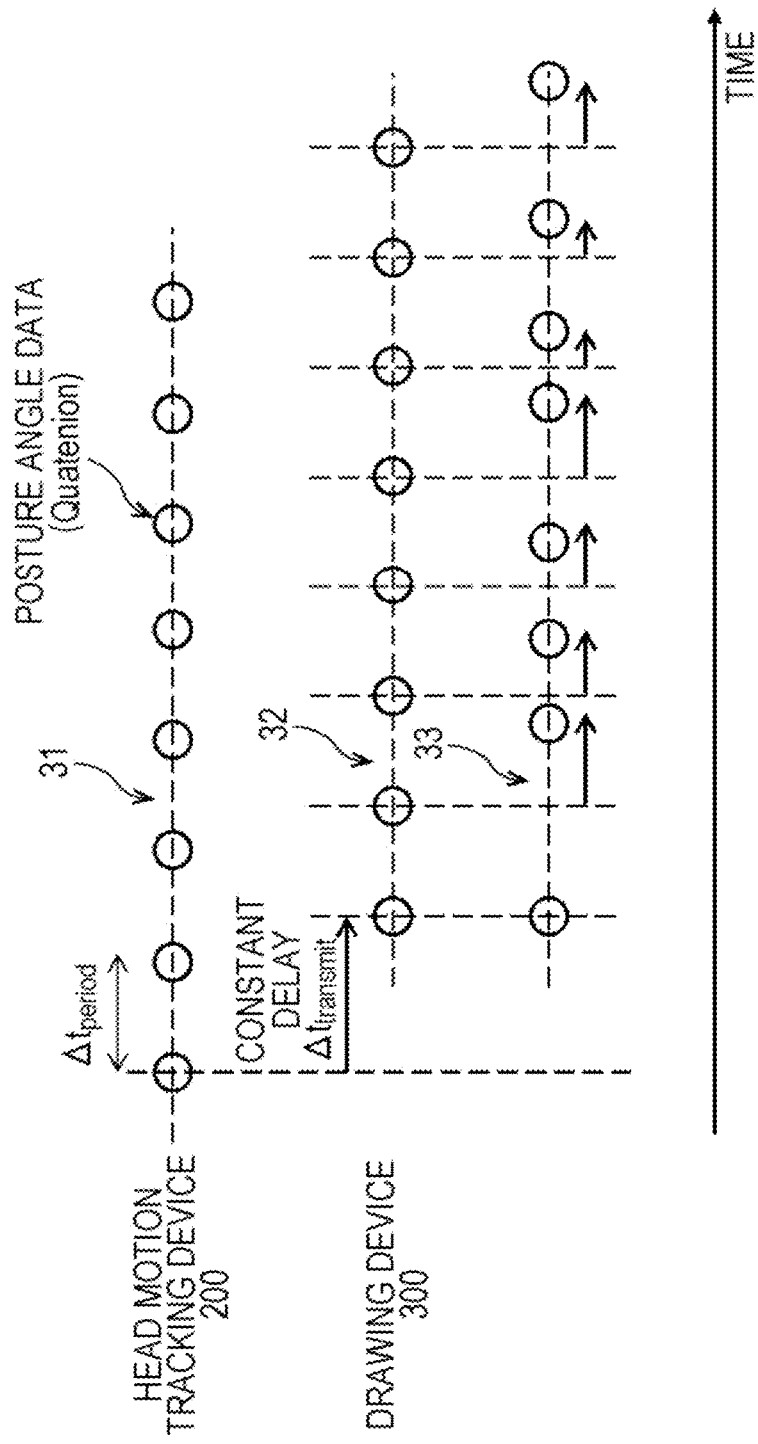
FIG. 3 is a diagram schematically illustrating a delay model in the image display system 100.

In FIG. 3, a delay model that occurs when the transmission is performed from the head motion tracking device 200 to the drawing device 300 in the image display system 100 is schematically illustrated.

The head motion tracking device 200 calculates the posture information (quaternion) of the head of the user from the detection result of the sensor unit 201, and outputs the posture information at every predetermined sending period $\Delta t_{period}$ as illustrated by a data series represented by reference number 31.

In a case where the transmission delay that occurs when the posture information is transmitted from the head motion tracking device 200 to the drawing device 300 is constant, the posture information generated at the time of the sending at each sending period arrives at the drawing device 300 after an invariably fixed transmission delay $\Delta t_{transmit}$ as illustrated by a data series represented by reference number 32. In other words, each item of the posture information is received at a predetermined interval. However, since the transmission delay includes a constant component and a variation component, the transmission delay is different every time as illustrated by a data series represented by reference number 33. The transmission delay that occurs at the time of the i-th sending is expressed as $\Delta t^{i}_{transmit}$. For example, in a case where the protocol such as the SPP for the Bluetooth (registered trademark) communication is used for the transmission from the head motion tracking device 200 to the drawing device 400, the transmission delay is assumed to be varied.

It is preferable that the display device 400 presents the image following the movement of the motion of the head of the user with a shorter delay time. A sense of feeling that the image is following the motion of the head is deteriorated by a long delay time. In addition, it is concerned that the user may feel sick.

In the image display system 100, as mentioned above, the posture information that arrives at the drawing device 300 from the head motion tracking device 200 is characterized by variations in the transmission delay. In the present embodiment, at the drawing device 300, the posture information at a certain time after a series of the posture information that has already been received is predicted, and the rendering processing is performed on the image based on the predicted posture information. Consequently, the sense of delay felt when the image following the movement of the head of the user is presented is reduced.

First, a data flow of the posture prediction processing will be described with reference to FIG. 2. An offset is removed from a sensor value output from the sensor unit 201 using an offset value measured in advance. The posture angle operation unit 202 estimates the posture using the sensor value after the removal of the offset to obtain the quaternion indicating a sensor power coordinate rotation. The coordinate rotation as used herein represents a conversion from an inertial coordinate system (global coordinate system) fixed to the ground to a local coordinate system fixed to the display device 400.

Once the quaternion after the posture estimation is sent from the head motion tracking device 200 to the drawing device 300, the value of the quaternion received at the receiving unit 301 is stored in an array at the drawing device 300. The length of the array is fixed at size n which is required for the prediction algorithm for the posture. The latest n quaternions are always stored in the array. The posture prediction processing is performed using the value stored in the quaternion array, whereby a single quaternion can be obtained. The drawing processing unit 302 performs, using the obtained quaternion of the prediction result, the coordinate rotation for a 3D model to be displayed on the display device 400. The drawing processing unit 302 then performs the rendering processing to update the drawing.

The prediction algorithm for the posture information is roughly divided into two steps: (1) estimating a predicted time to display the image that is based on the next posture information; and (2) predicting the posture information at the predicted time. The drawing processing unit 302 renders the image at the predicted time from the predicted posture information, whereby the display device 400 reduces the sense of delay felt when the user observes the image following the movement of the head.

Next, a method for estimating the predicted time will be described. The predicted time as used herein is a period of time from a time when the latest one of the data previously received by the drawing device 300 from the head motion tracking device 200 is generated (measured or calculated) in the head motion tracking device 200 or a time when the head motion tracking device 200 performs the sending to a time when the next image is displayed. Not only a time of a sending moment but also a time when time information is generated and added to the data in the head motion tracking device 200 can be used as the data sending time of the head motion tracking device 200.

In a case where the data are transmitted from the head motion tracking device 200 to the drawing device 300 in particular wirelessly, it is assumed that the transmission delay is not fixed but varies in a certain range. Since the clock of the sensor unit 201 (head motion tracking device 200) and the clock of the drawing device 300 are not synchronized with each other, the drawing device 300 is not allowed to use the time information added to the received data as it is. However, the drawing device 300 can estimate the sending time using the receiving time.

Figure 10:
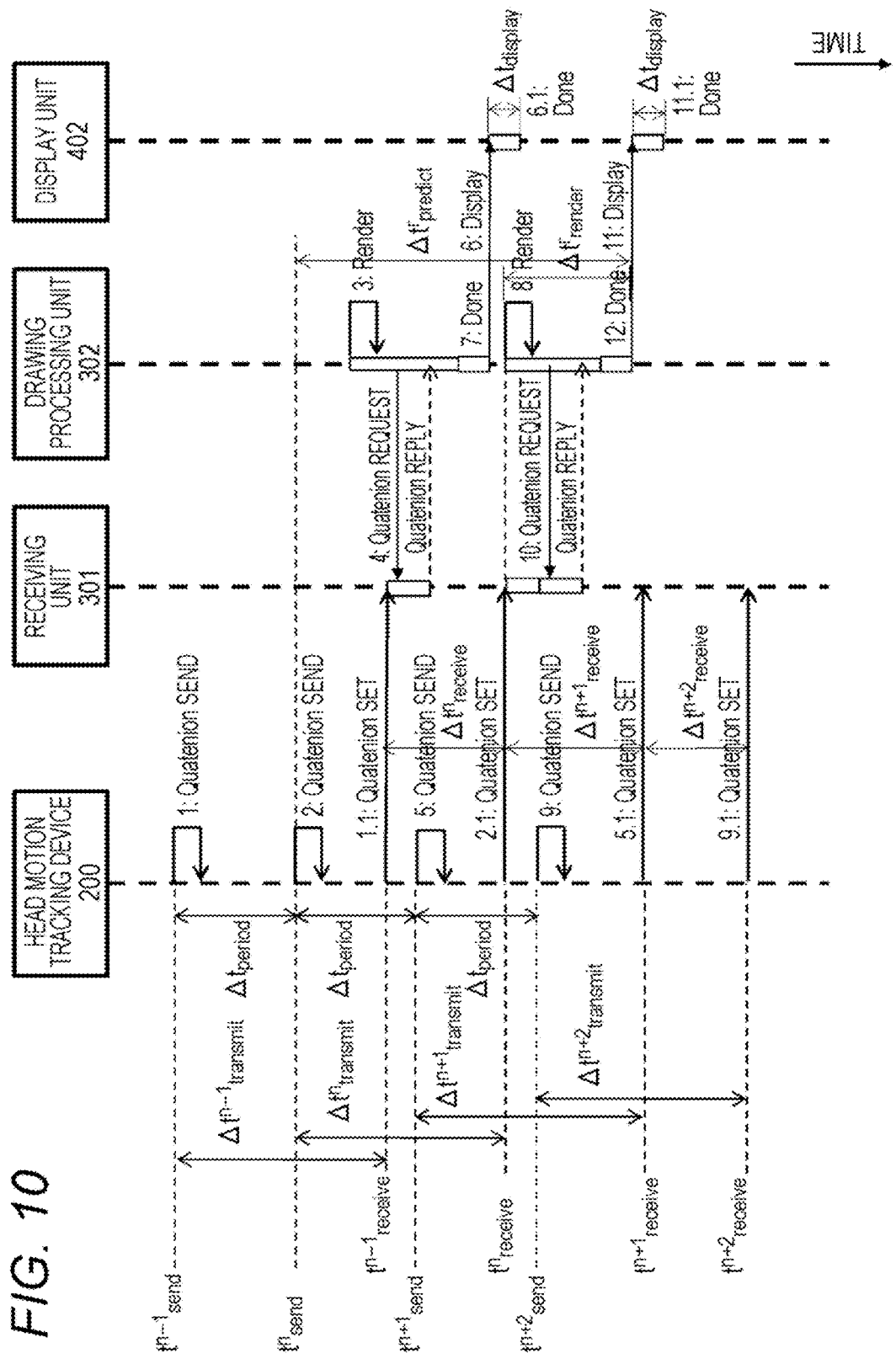
FIG. 10 is a timing chart illustrating a flow of a process in the image display system 100.

In FIG. 10, a flow of a process in the image display system 100 is illustrated on a timing chart. Referring to FIG. 10, a method for estimating, in the drawing device 300, the time of sending the data from the head motion tracking device 200 will be considered.

In FIG. 10, the period of sending the data from the head motion tracking device 200 is denoted as $\Delta t_{period}$, the time of sending the n-th data from the head motion tracking device 200 is denoted as $t^n_{send}$, the time of receiving the n-th data at the drawing device 300 is denoted as $t^n_{receive}$, and the time (transmission delay) required from the sending of the n-th data to the receiving at the drawing device 300 is denoted as $\Delta t^n_{transmit}$. The time (rendering delay) $\Delta t^r_{render}$ is assumed to be required for the r-th rendering calculation in the drawing processing unit 302, and the time (display delay) $\Delta t_{display}$ is assumed to be required for the display of the rendering result on the display unit 402.

The head motion tracking device 200 sends, to the drawing device 300 at every time after $\Delta t_{period}$, the quaternion operated from the sensor result of the sensor unit 201. The receiving unit 301 manages the received quaternion together with the receiving time. The drawing processing unit 302 accesses the quaternion accumulated in the receiving unit 301 at a timing required for the rendering to render a corresponding display image. After the rendering, a result image is displayed on the display unit 402 of the display device 400.

In the drawing device 300, each time of the data sending period $\Delta t_{period}$, the data receiving time $\{t^i_{receive}\}_{i \in N}$, the rendering delay $\Delta t^r_{render}$, and the display delay $\Delta t_{display}$ is a measurable known value. On the other hand, since the time of sending the data from the head motion tracking device 200 $\{t^i_{send}\}_{i \in N}$ is not known to the drawing device 300, the transmission delay $\{\Delta t^i_{transmit}\}_{i \in N}$ is an unknown value.

A total delay amount until the posture information sent by the head motion tracking device 200 at a certain time is received by the drawing device 300, further rendered by the drawing device 300, and displayed on the display device 400 can be represented by a mathematical formula such as the following formula (1) as a predicted time $\Delta t^r_{predict}$ for the r-th rendering.

[Mathematical Formula 1]

$$\Delta t_{period}{}^r = \Delta t_{display} + \Delta t_{render}{}^r + \Delta t_{transmit}{}^n \quad (1)$$

As mentioned above, while the values of the display delay $\Delta t_{display}$ of the first term of the above formula (1) and the rendering delay $\Delta t^r_{render}$ of the second term are known to the drawing device 300, the value of the transmission delay $\Delta t^n_{transmit}$ of the third term is unknown to the drawing device 300. Therefore, the total delay amount can be divided into a constant delay including the display delay $\Delta t_{display}$ and the rendering delay $\Delta t^r_{render}$, and an unknown variant delay $\Delta t^n_{transmit}$. In order to calculate the total delay amount $\Delta t^r_{predict}$ the unknown value $\{\Delta t^i_{transmit}\}_{i \in N}$ needs to be estimated using the known constant delay.

In this regard, a feature that a time interval for receiving the data on the drawing device 300 $\Delta t^i_{receive} = t^i_{receive} - t^{i-1}_{receive}$ ($i \in N$) is fixed is equivalent to a feature that the transmission delay $\{\Delta t^i_{transmit}\}_{i \in N}$ is fixed. By measuring the transmission delay time continuously for a certain period of time in advance, it is possible to measure an average value of the constant delay time $\Delta t_{const} = E_i(\Delta t^i_{transmit})$. Therefore, the third term of the above formula (1) can be divided into a constant transmission delay $\Delta t_{const}$ and a variant transmission delay $\Delta t^n_{variant}$ as represented by the following formula (2). In addition, when the following formula (2) is assigned to the above formula (1), the following formula (3) is obtained.

[Mathematical Formula 2]

$$\Delta t_{transmit}^n = \Delta t_{const} + \Delta t_{variant}^n \quad (2)$$

[Mathematical Formula 3]

$$\Delta t_{period}^r = \Delta t_{display} + \Delta t_{render}^r + \Delta t_{const} + \Delta t_{variant}^n \quad (3)$$

The first to third terms on the right side of the above formula (3) can be measured by preliminary measurement or system clock measurement, and are classified as the constant delay. In the present embodiment, the display delay $\Delta t_{display}$ of the first term on the right side and the constant transmission delay $\Delta_{const}$ of the third term on the right side are measured in advance and used for the estimation of the predicted time.

Meanwhile, the fourth term $\Delta t^n_{variant}$ on the right side of the above formula (3) is the variation in the transmission delay. The variation in the transmission delay $\Delta t^n_{variant}$ cannot be measured and is classified as the variant delay. In the present embodiment, the variant transmission delay $\Delta t^n_{variant}$ is represented by a mathematical formula such as the following formula (4) or (5). In this regard, a method for developing the variant transmission delay $\Delta t^n_{variant}$ shown in the following formula (4) will be described in detail later.

[Mathematical Formula 4]

$$\Delta t_{variant}^n = \frac{n-2}{n-1}\Delta t_{variant}^{n-1} + \Delta t_{receive}^n - \Delta t_{period} \quad (4)$$

[Mathematical Formula 5]

$$\Delta t_{variant}^n = \Delta t_{variant}^{n-1} + \Delta t_{receive}^n - \Delta t_{period} \quad (5)$$

The receiving time interval $\Delta t^n_{receive}$ on the right side of the above formula (4) or (5) is a difference between the time $t^{n-1}_{receive}$ when the (n−1)-th quaternion of the posture information sent from the head motion tracking device 200 is received at the drawing device 300 and the time $t^n_{receive}$ when the n-th quaternion of the posture information sent from the head motion tracking device 200 is received at the drawing device 300. If there is no variation in the transmission delay, the receiving time interval $\Delta t^n_{receive}$ (=$t^n_{receive}$−$t^{n-1}_{receive}$) equals the period $\Delta t_{period}$ of sending the posture information from the head motion tracking device 200. If these is the variation, however, $\Delta t^n_{receive}-\Delta t_{period}$ is no longer zero. In the above formula (4), the variations in the intervals for receiving the previous n items of the posture information are summed to estimate the variant transmission delay $\Delta t^n_{variant}$. The above formula (5) can also be regarded as an approximate formula for a case where n is infinity.

The total delay amount $\Delta t^r_{predict}$ represented by the above formula (1) and derived from the sum of the constant delay (average of the display delay, the rendering delay, and the transmission delay) and the variant delay becomes the predicted time to receive the posture information sent at a certain time from the head motion tracking device 200.

Next, a method for predicting the posture information at the predicted time will be described.

Figure 4:
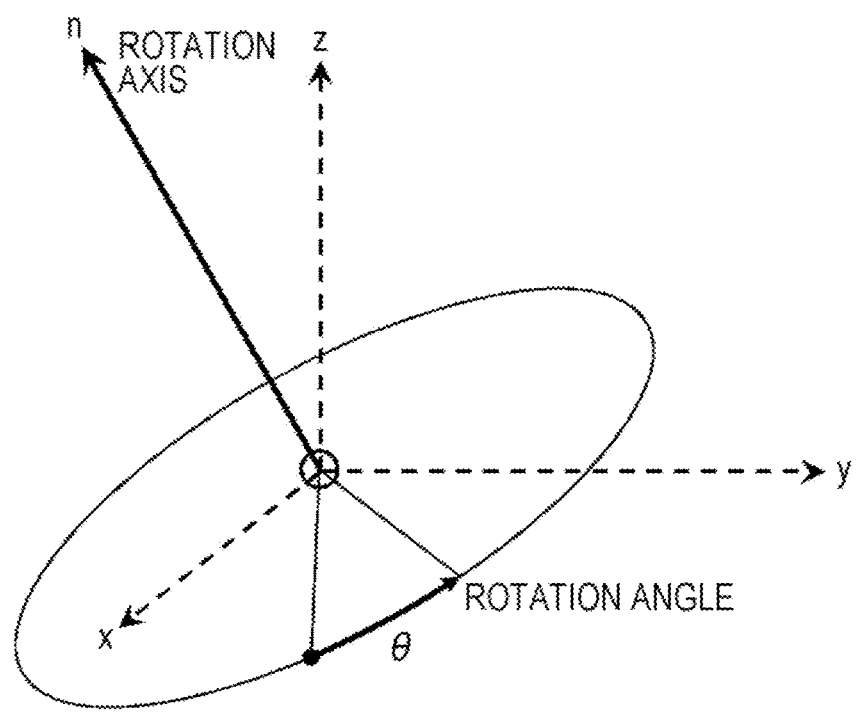
FIG. 4 is a diagram illustrating a quaternion q.

In the present embodiment, as already mentioned, the posture information is represented by the quaternion q. As represented by the following formula (6) and FIG. 4, the quaternion q is a quaternion including a rotation axis (vector) and a rotation angle (scalar).

[Mathematical Formula 6]

$$\begin{aligned} q &= s + ix + jy + kz \\ &= (s, x, y, z) \\ &= (\cos(\theta/2), n\sin(\theta/2)) \end{aligned} \quad (6)$$

Since the quaternion has no singular point, the quaternion is suitable for the calculation. In the field of the computer graphics, a posture of an object is generally represented by the quaternion. In the present embodiment, the quaternion at the predicted time $\Delta t^r_{predict}$ is predicted from a time series of the quaternion $q_i$ ($q_i$ is assumed to be the i-th quaternion received) that has arrived at the drawing device 300 from the head motion tracking device 200.

Figure 5:
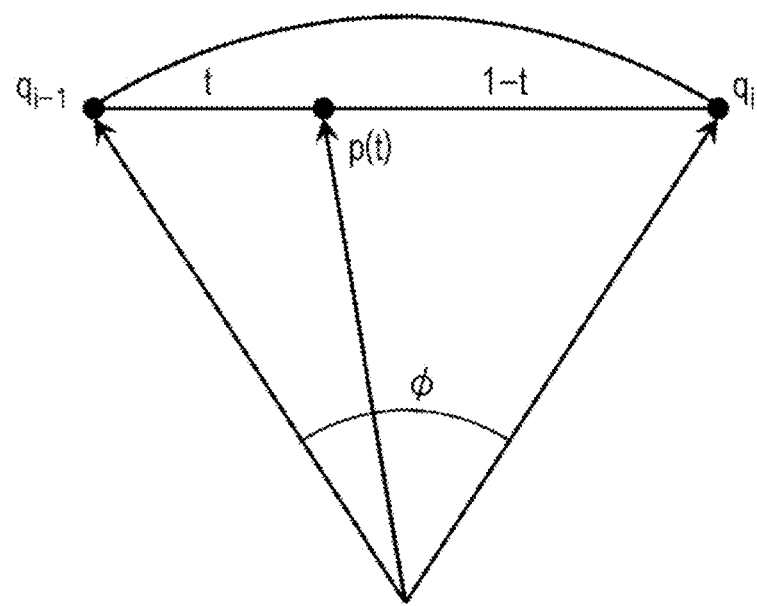
FIG. 5 is a diagram for describing a method for performing a linear interpolation between two quaternions.
Figure 6:
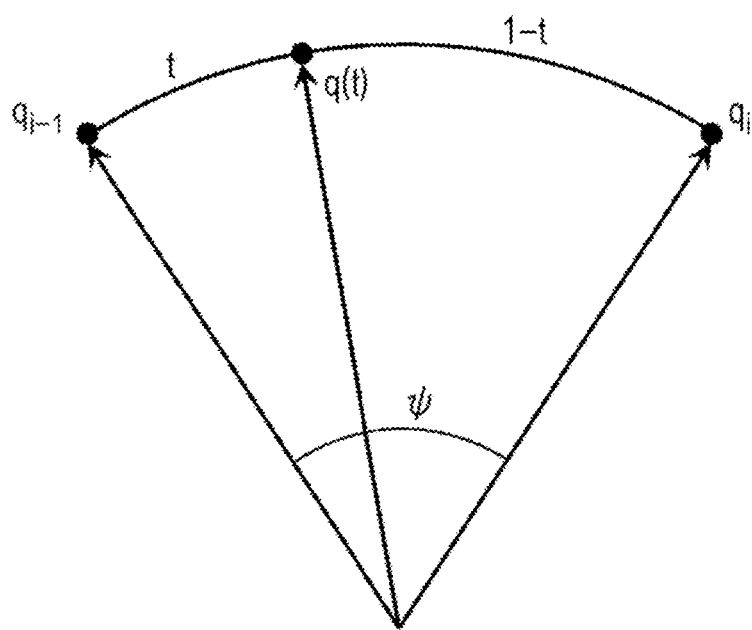
FIG. 6 is a diagram for describing a method for performing a spherical linear interpolation between two quaternions.

The quaternion representing the posture is described as a single point on a three-dimensional spherical surface. Examples of a method for performing a linear interpolation between the two quaternions $q_{i-1}$ and $q_i$ include a method Lerp for performing a linear interpolation on a line segment connecting destination points of the quaternions $q_{i-1}$ and $q_i$ as represented by the following formula (7) and FIG. 5, and a method Slerp for performing a spherical linear interpolation on a three-dimensional spherical surface between the quaternions $q_{i-1}$ and $q_i$ as represented by the following formula (8) and FIG. 6.

[Mathematical Formula 7]

$$\text{Lerp}(t;q_{i-1},q_i) = (1-t)q_{i-1} + tq_i \quad (7)$$

[Mathematical Formula 8]

$$\text{Slerp}(t;q_{i-1},q_i) = q_{i-1}(q_{i-1}^{-1}q_i)^t \quad (8)$$

It is considered that the spherical linear interpolation Slerp performs the interpolation more accurately than the general linear interpolation Lerp.

In the above formula (8), when $0 \le t \le 1$ is satisfied, the linear interpolation is performed between the two quaternions $q_{i-1}$ and $q_i$. When $t \ge 1$ is satisfied, a portion ahead of the two quaternions $q_{i-1}$ and $q_i$ is extrapolated to predict a quaternion ahead by the time t. In the present embodiment, therefore, the quaternion after the predicted time is predicted by assigning the estimated predicted time to t of the above formula (8).

The interval for sending the quaternions $q_{i-1}$ and $q_i$ from the head motion tracking device 200 is $\Delta t_{period}$. In addition, the predicted time to receive, at the drawing device 300, the quaternion $q_{i+1}$ subsequently sent from the head motion tracking device 200 is a time $\Delta t_{period} + \Delta t^r_{predict}$ obtained by adding the total delay amount $\Delta t^r_{predict}$ to the sending interval $\Delta t_{period}$. This time is normalized by the sending interval $\Delta t_{period}$ to obtain a value ($t_r = 1 + \Delta t^r_{predict}/\Delta t_{period}$), and this value is assumed to be t and assigned to the above formula (8), whereby the quaternion $q_{predict}$ ($t_r$) after the predicted time $\Delta t^r_{predict}$ can be predicted in accordance with the following formula (9) or (10). In this regard, $q_{predict}$ ($t_{n-1}$) of the following formula (10) is replaced with the following formula (11). A method for developing the quaternion $q_{predict}$ ($t_r$) at the predicted time $t_r$ shown in the following formula (9) will be described in detail later.

[Mathematical Formula 9]

$$q_{predict}(t_r) = Slerp\left(1 + \frac{\Delta t^r_{predict}}{\Delta t_{period}}; q(t_{n-1}), q(t_n)\right) \quad (9)$$

[Mathematical Formula 10]

$$q_{predict}(t_r) = Slerp\left(1 + \frac{\Delta t^r_{predict}}{\Delta t_{period}}; q_{predict}(t_{n-1}), q(t_n)\right) \quad (10)$$

[Mathematical Formula 11]

$$q_{predict}(t_{n-1}) = q(t_{n-1}) \otimes q(t_n)^{-1} \otimes q(t_{n-1}) \otimes q(t_{n-2})^{-1} \otimes q(t_{n-1}) \quad (11)$$

$\otimes$ : explicitly represented quaternion product

Figure 7:
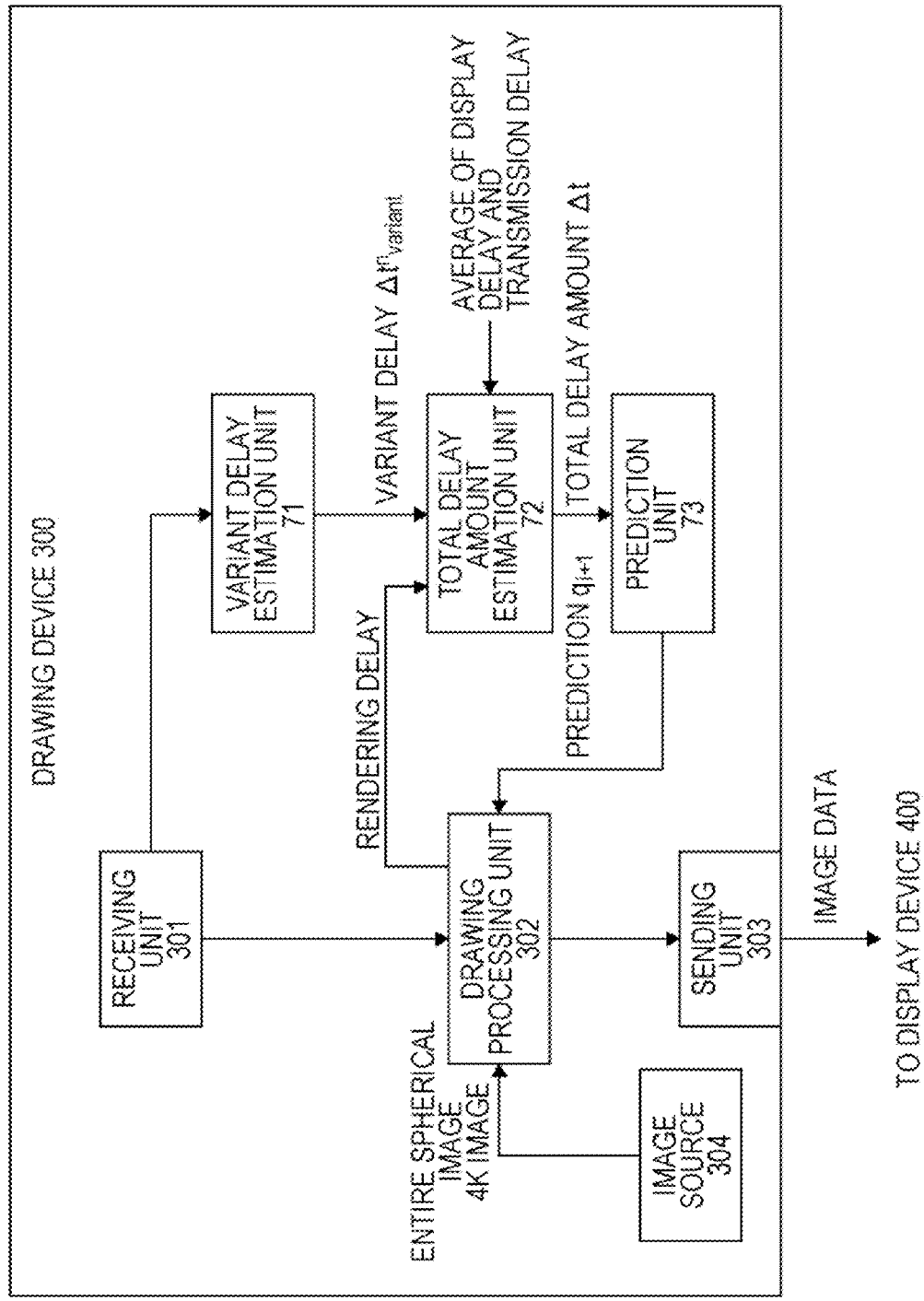
FIG. 7 is a diagram illustrating an exemplary configuration of a drawing device 300 to which a prediction algorithm for posture information is applied.

In FIG. 7, an exemplary configuration of the drawing device 300 to which the prediction algorithm for the posture information is applied is illustrated.

A variant delay estimation unit 71 monitors the time when the receiving unit 301 receives the quaternion from the head motion tracking device 200 to estimate the variant delay $\Delta t^n_{variant}$ in accordance with the above formula (4) or (5).

A total delay amount calculation unit 72 inputs the variant delay $\Delta t^n_{variant}$ from the variant delay estimation unit 71 and inputs the average of the display delay and the transmission delay as well as the rendering delay in the drawing processing unit 302 measured in advance to calculate the total delay amount $\Delta t$ in accordance with the above formula (1).

A prediction unit 73 is configured as a spherical linear interpolator (Slerp) that performs the linear interpolation on the three-dimensional spherical surface between the two quaternions. By assigning the predicted time obtained from the total delay amount $\Delta t$ to the parameter t, as represented by the above formula (6), the prediction unit 73 extrapolates the next quaternion $q_{i+1}$ to predict the quaternion as current correct posture information. The prediction unit 73 then outputs the predicted quaternion q to the drawing processing unit 302. The drawing processing unit 302 executes, using the predicted quaternion q, the rendering for an image of an angle of view corresponding to the posture information of the head of the user.

Figure 8:
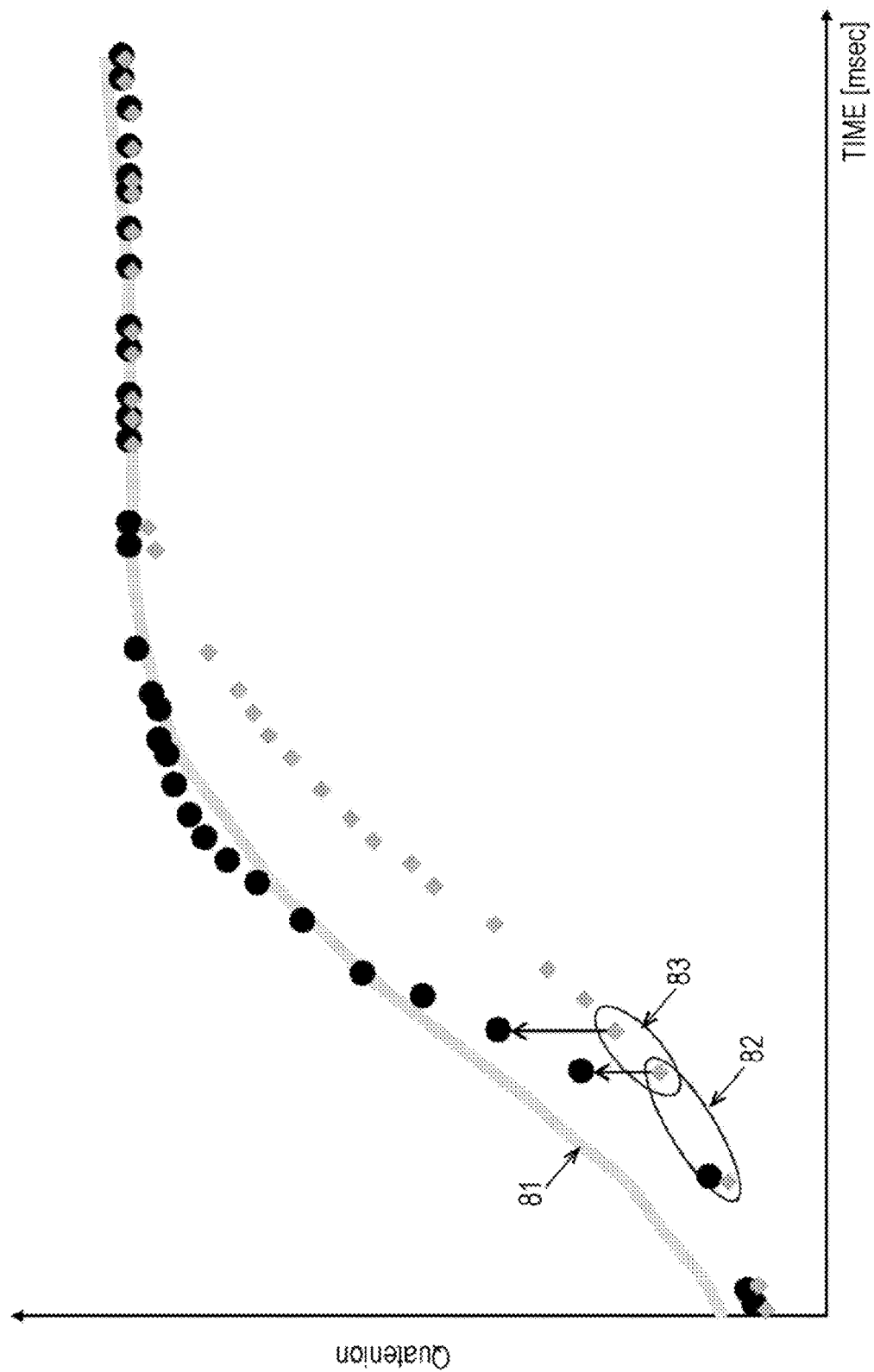
FIG. 8 is a diagram illustrating a time series graph of a prediction result of the quaternion.

In FIG. 8, a time series graph of the prediction result of the quaternion by the prediction unit 73 is illustrated. In the graph, a horizontal axis is a time axis, and a vertical axis is an s component of the quaternion.

A curved line represented by reference number 81 in FIG. 8 is a correct answer value of the s component of the quaternion, that is, a value output from the head motion tracking device 200.

The s component of the quaternion (quaternion before the prediction) received at the drawing device 300 is denoted by a black square (♦). As mentioned above, the transmission delay occurs when the quaternion is transmitted from the head motion tracking device 200 to the drawing device 300, and the transmission delay varies according to each quaternion.

As represented by reference numbers 82, 83, the prediction unit 73 predicts the current correct quaternion at the predicted time from the received two quaternions to output the predicted quaternion to the drawing processing unit 302. In FIG. 8, the s component of the quaternion predicted from the two quaternions before the prediction is denoted by a black circle (●). It can be understood that the predicted quaternion is approaching the correct answer value.

Hereinafter, the method for developing the variant transmission delay $\Delta t^n_{variant}$ shown in the above formula (4) will be described. A relational formula represented by the following formula (12) is established between the time interval for receiving the data $\Delta t^i_{receive}$ and the transmission delay $\Delta^i_{variant}$. When the following formula (13) is used in the following formula (12), the following formula (14) is obtained.

[Mathematical Formula 12]

$$\Delta t_{transmit}^{i+1} + \Delta t_{period} = \Delta t_{receive}^{i+1} + \Delta t_{transmit}^{i} \quad (i \in \mathbb{N}\backslash\{0\}) \quad (12)$$

[Mathematical Formula 13]

$$\Delta t_{variant}^{i} = \Delta t_{transmit}^{i} - \Delta t_{const} \quad (i \in \mathbb{N}) \quad (13)$$

[Mathematical Formula 14]

$$\Delta t_{variant}^{i+1} + \Delta t_{period} = \Delta t_{receive}^{i+1} + \Delta t_{variant}^{i} \quad (i \in \mathbb{N}\backslash\{0\}) \quad (14)$$

An average value of the variant transmission delay $\Delta t^i_{variant}$ should be zero. Therefore, the following formula (15) is satisfied.

[Mathematical Formula 15]

$$\sum_{i=0}^{\infty} \Delta t_{variant}^{j} = 0 \quad (15)$$

In this case, the above formula (14) is modified to obtain the following formula (16).

[Mathematical Formula 16]

$$\Delta t_{variant}^{i+1} - \Delta t_{variant}^{i} = \Delta t_{receive}^{i+1} - \Delta t_{period} \quad (i \in \mathbb{N}\backslash\{0\}) \quad (16)$$

When certain N is fixed, the following formula (17) and the following formula (18) are obtained by taking the total sum of both sides of the above formula (16) regarding $j \leq i \leq N-1$ with respect to arbitrary j.

[Mathematical Formula 17]

$$\sum_{i=j}^{N-1}(\Delta t_{variant}^{i+1} - \Delta t_{variant}^{i}) = \sum_{i=j}^{N-1}(\Delta t_{receive}^{i+1} - \Delta t_{period}) \quad (17)$$

where $j \leq i \leq N-1$ is satisfied with respect to $N \geq 2 \in \mathbb{N}$ and $j \leq N \in \mathbb{N}\backslash\{0\}$

[Mathematical Formula 18]

$$\Delta t_{variant}^{N} - \Delta t_{variant}^{j} = \sum_{i=j}^{N-1} \Delta t_{receive}^{i+1} + (N-j)\Delta t_{period} \quad (18)$$

Furthermore, the following formulas (19) and (20) are satisfied by taking the total sum of both sides of the above formula (18) regarding i.

[Mathematical Formula 19]

$$\sum_{j=1}^{N-1}(\Delta t_{variant}^{N}-\Delta t_{variant}^{j})=\sum_{j=1}^{N-1}\left(\sum_{i=j}^{N-1}\Delta t_{receive}^{i+1}+(N-j)\Delta t_{period}\right) \quad (19)$$

[Mathematical Formula 20]

$$(N-1)\Delta t_{variant}^{N}-\sum_{j=1}^{N-1}(\Delta t_{variant}^{j})= \quad (20)$$
$$\sum_{j=1}^{N-1}\sum_{i=j}^{N-1}\Delta t_{receive}^{i+1}+\frac{(N-1)N}{2}\Delta t_{period}$$

In this case, from the above formula (5), when N is sufficiently great, the following formula (21) is derived. Therefore, the above formula (20) becomes the following formula (22). When N of the following formula (22) is replaced with N+1, the following formula (23) is obtained.

[Mathematical Formula 21]

$$\sum_{i=0}^{\infty}\Delta t_{variant}^{i}\cong 0 \quad (21)$$

[Mathematical Formula 22]

$$(N-1)\Delta t_{variant}^{N}\cong\sum_{j=1}^{N-1}\sum_{i=j}^{N-1}\Delta t_{receive}^{i+1}+\frac{(N-1)N}{2}\Delta t_{period} \quad (22)$$

[Mathematical Formula 23]

$$N\Delta t_{variant}^{N+1}\cong\sum_{j=1}^{N}\sum_{i=j}^{N}\Delta t_{receive}^{i+1}+\frac{N(N+1)}{2}\Delta t_{period} \quad (23)$$

By subtracting both sides of the above formula (22) from the corresponding sides of the above formula (23), the following formula (24) is obtained.

[Mathematical Formula 24]

$$N\Delta t_{variant}^{N+1}-(N-1)\Delta t_{variant}^{N}\cong \quad (24)$$
$$\left(\sum_{j=1}^{N}\sum_{i=j}^{N}\Delta t_{receive}^{i+1}+\frac{N(N-1)}{2}\Delta t_{period}\right)-$$
$$\left(\sum_{j=1}^{N-1}\sum_{i=j}^{N-1}\Delta t_{receive}^{i+1}+\frac{(N-1)N}{2}\Delta t_{period}\right)$$

In this case, attention is paid to the feature that the first term on the right side of the above formula (23) is modified as represented by the following formula (25) and the following formula (26) is satisfied. Consequently, the following formulas (27) and (28) are satisfied with respect to the above formula (24).

[Mathematical Formula 25]

$$\sum_{j=1}^{N}\sum_{i=j}^{N}\Delta t_{receive}^{i+1}=\sum_{j=1}^{N-1}\sum_{i=j}^{N}\Delta t_{receive}^{i+1}+\Delta t_{receive}^{N+1} \quad (25)$$
$$=\sum_{j=1}^{N-1}\left(\sum_{i=j}^{N-1}\Delta t_{receive}^{i+1}+\Delta t_{receive}^{N+1}\right)+\Delta t_{receive}^{N+1}$$
$$=\sum_{j=1}^{N-1}\sum_{i=j}^{N-1}\Delta t_{receive}^{i+1}+\sum_{j=1}^{N-1}\Delta t_{receive}^{N+1}+\Delta t_{receive}^{N+1}$$
$$=\sum_{j=1}^{N-1}\sum_{i=j}^{N-1}\Delta t_{receive}^{i+1}+(N-1)\Delta t_{receive}^{N+1}+\Delta t_{receive}^{N+1}$$
$$=\sum_{j=1}^{N-1}\sum_{i=j}^{N-1}\Delta t_{receive}^{i+1}+N\Delta t_{receive}^{N+1}$$

[Mathematical Formula 26]

$$\sum_{j=1}^{N}\sum_{i=j}^{N}\Delta t_{receive}^{i+1}-\sum_{j=1}^{N-1}\sum_{i=j}^{N-1}\Delta t_{receive}^{i+1}=N\Delta t_{receive}^{N+1} \quad (26)$$

[Mathematical Formula 27]

$$N\Delta t_{variant}^{N+1}-(N-1)\Delta t_{variant}^{N}=\left(\sum_{j=1}^{N}\sum_{i=j}^{N}\Delta t_{receive}^{i+1}-\sum_{j=1}^{N-1}\sum_{i=j}^{N-1}\Delta t_{receive}^{i+1}\right)- \quad (27)$$
$$\left(\frac{N(N+1)}{2}-\frac{(N-1)N}{2}\right)\Delta t_{period}$$
$$=N\Delta t_{receive}^{N+1}-N\Delta t_{period}$$

[Mathematical Formula 28]

$$\Delta t_{variant}^{N+1}-\frac{N-1}{N}\Delta t_{variant}^{N}\cong\Delta t_{receive}^{N+1}-\Delta t_{period} \quad (28)$$

Therefore, when the above formula (28) is assumed to be an estimation formula regarding $\Delta t^{N+1}_{variant}$, the following formula (29) is satisfied with respect to sufficiently great N, and the above formula (4) can be developed.

[Mathematical Formula 29]

$$\Delta t_{variant}^{N+1}=\frac{N-1}{N}\Delta t_{variant}^{N}+\Delta t_{receive}^{N+1}-\Delta t_{period} \quad (29)$$

Next, the method for developing the quaternion $q_{predict}(t_r)$ at the predicted time $t_r$ shown in the above formula (9) will be described. By using the latest three quaternions $q(t_{n-2})$, $q(t_{n-1})$, and $q(t_n)$ obtained up to now and by using a formula for the spherical linear interpolation, the predicted quaternion $q_{predict}(t_r)$ is calculated as follows.

[Mathematical Formula 30]

$$\Delta q_{predict}(t_n) = Slerp(2; q(t_{n-1}) \otimes q(t_{n-2})^{-1}, q(t_n) \otimes q(t_{n-1})^{-1}) \quad (30)$$
$$= \left((q(t_n) \otimes q(t_{n-1})^{-1}) \otimes (q(t_{n-1}) \otimes q(t_{n-2})^{-1})^{-1}\right)^2 \otimes (q(t_{n-1}) \otimes q(t_{n-2})^{-1})$$
$$= \left((q(t_n) \otimes q(t_{n-1})^{-1}) \otimes (q(t_{n-1}) \otimes q(t_{n-2})^{-1})^{-1}\right) \otimes (q(t_n) \otimes q(t_{n-1})^{-1})$$
$$= q(t_n) \otimes q(t_{n-1})^{-1} \otimes q(t_{n-2}) \otimes q(t_{n-1})^{-1} \otimes q(t_n) \otimes q(t_{n-1})^{-1}$$

[Mathematical Formula 31]

$$q_{predict}(t_r) = \Delta q_{predict}(t_n)^{\frac{\Delta t^r_{predict}}{\Delta t_{predict}}} q(t_n) \quad (31)$$
$$= (q(t_n) \otimes q(t_{n-1})^{-1} \otimes q(t_{n-2}) \otimes q(t_{n-1})^{-1} \otimes q(t_n) \otimes q(t_{n-1})^{-1})^{\frac{\Delta t^r_{predict}}{\Delta t_{predict}}} q(t_n)$$
$$= (q(t_n) \otimes q(t_{n-1})^{-1} \otimes q(t_{n-2}) \otimes q(t_{n-1})^{-1} \otimes q(t_n) \otimes q(t_{n-1})^{-1})^{\left(1+\frac{\Delta t^r_{predict}}{\Delta t_{predict}}\right)} \otimes (q(t_n) \otimes q(t_{n-1})^{-1} \otimes q(t_{n-2}) \otimes q(t_{n-1})^{-1} \otimes q(t_n) \otimes q(t_{n-1})^{-1})^{-1} q(t_n)$$
$$= (q(t_n) \otimes q(t_{n-1})^{-1} \otimes q(t_{n-2}) \otimes q(t_{n-1})^{-1} \otimes q(t_n) \otimes q(t_{n-1})^{-1})^{\left(1+\frac{\Delta t^r_{predict}}{\Delta t_{predict}}\right)} \otimes (q(t_{n-1}) \otimes q(t_n)^{-1} \otimes q(t_{n-1}) \otimes q(t_{n-2})^{-1} \otimes q(t_{n-1}) \otimes q(t_n)^{-1}) q(t_n)$$
$$= (q(t_n) \otimes q(t_{n-1})^{-1} \otimes q(t_{n-2}) \otimes q(t_{n-1})^{-1} \otimes q(t_n) \otimes q(t_{n-1})^{-1})^{\left(1+\frac{\Delta t^r_{predict}}{\Delta t_{predict}}\right)} \otimes (q(t_{n-1}) \otimes q(t_n)^{-1} \otimes q(t_{n-1}) \otimes q(t_{n-2})^{-1} \otimes q(t_{n-1}))$$

The above formula (30) means that differentiation of the quaternion is predicted. The above formula (31) predicts the quaternion of the posture ahead by the predicted time $\Delta t^r_{predict}$ using the above-mentioned predicted quaternion $q_{predict}(t_n)$.

In this case, when the following formula (32) is set, the above formula (31) becomes the following formula (33).

[Mathematical Formula 32]

$$q_{predict}(t_{n-1}) = \quad (32)$$
$$q(t_{n-1}) \otimes q(t_n)^{-1} \otimes q(t_{n-1}) \otimes q(t_{n-2})^{-1} \otimes q(t_{n-1})$$

[Mathematical Formula 33]

$$q_{predict}(t_r) = (q(t_n) \otimes q_{predict}(t_{n-1})^{-1})^{\left(1+\frac{\Delta t^r_{predict}}{\Delta t_{predict}}\right)} \quad (33)$$
$$= Slerp\left(1 + \frac{\Delta t^r_{predict}}{\Delta t_{predict}}; q_{predict}(t_{n-1}), q(t_n)\right)$$

In other words, it can be understood that, in this developing method, the quaternion $q_{predict}(t_r)$ at the predicted time $t_r$ is predicted by the spherical linear interpolation using the value $q_{predict}(t_{n-1})$ estimating the quaternion $q(t_{n-1})$.

CITATION LIST

Patent Documents

Patent Document 1: Japanese Patent Application Laid-Open No. 2012-141461
Patent Document 2: Japanese Patent Application Laid-Open No. 09-106322
Patent Document 3: Japanese Patent Application Laid-Open No. 2010-256534

INDUSTRIAL APPLICABILITY

The technique disclosed in the present description has been described in detail so far with reference to the specific embodiment. However, it is obvious that a person skilled in the art can modify or replace the embodiment in a range not deviating from the gist of the technique disclosed in the present description.

In the present description, the embodiment for rendering an image based on posture information, as time series data, of a part or all of a body of a user such as a head, an end of a hand, an end of a foot, and a waist has mainly been described. In a case where the image is rendered based on other time series data, the technique disclosed in the present description can be applied in the same way. In the present description, the embodiment for representing the posture information by a quaternion has also mainly been described. In a case where the posture information is represented by other forms, the technique disclosed in the present description can be applied in the same way.

To sum up, the technique disclosed in the present description has been described by an exemplary embodiment, and the contents of the present description should not be interpreted restrictively. The scope of the claims should be referred to for determining the gist of the technique disclosed in the present description.

Meanwhile, the technique disclosed in the present description can also be configured as follows.

(1) An image processing device including:
a receiving unit that receives time series data from an external device;
a predicted time calculation unit that calculates a predicted time from a time when the latest one of previously received data is generated in the external device to a time when a next image is displayed;
a time series data prediction unit that predicts time series data at the predicted time; and
a drawing processing unit that renders an image based on the time series data predicted by the prediction unit.

(2) The image processing device according to the above-mentioned (1), wherein
the time series data prediction unit includes a configuration to interpolate between two pieces of time series data, and extrapolates a portion ahead of the two pieces of time series data to predict time series data ahead by the predicted time.

(3) The image processing device according to any of the above-mentioned (1) or (2), further including a sending unit that sends the rendered image to a display device.

(4) The image processing device according to any of the above-mentioned (1) to (3), further including a display unit that displays the rendered image.

(5) The image processing device according to any of the above-mentioned (1) to (5), wherein the external device tracks a position or a posture of a part or all of a body of a user who observes an image, the receiving unit receives, from the external device, posture information as the time series data, and the drawing processing unit renders, based on the posture information, an image following a movement of a part or all of the body of the user.

(6) The image processing device according to the above-mentioned (5), wherein the predicted time calculation unit calculates the predicted time based on a total delay amount from when the posture information is sent from the external device to when an image that is based on the posture information is displayed.

(7) The image processing device according to the above-mentioned (6), wherein the total delay amount includes a transmission delay that occurs when the posture information is transmitted from the external device, a rendering delay that occurs when the image is rendered based on the posture information, and a display delay that occurs when the rendered image is displayed.

(8) The image processing device according to any of the above-mentioned (6) or (7), wherein the predicted time calculation unit divides the total delay amount into a constant delay that is measurable and a variant delay that is unmeasurable to calculate the total delay amount.

(9) The image processing device according to the above-mentioned (8), wherein the variant delay includes a variation in the transmission delay.

(10) The image processing device according to the above-mentioned (5), wherein the receiving unit receives, from the external device, a quaternion representing the position or the posture of a part or all of the body of the user as the time series data.

(11) The image processing device according to the above-mentioned (10), wherein the time series data prediction unit includes a configuration to perform a linear interpolation on two quaternions, and extrapolates a portion ahead of the two quaternions to predict a quaternion ahead by the predicted time.

(12) The image processing device according to any of the above-mentioned (10) or (11), wherein the time series data prediction unit includes a configuration to perform a spherical linear interpolation on two quaternions, and extrapolates a portion ahead of the two quaternions to predict a quaternion ahead by the predicted time.

(13) An image processing device including:

a receiving unit that receives time series data from an external device;

a predicted time calculation unit that calculates a predicted time from a time added, in the external device, to the latest one of previously received data to a time when a next image is displayed;

a time series data prediction unit that predicts time series data at the predicted time; and a drawing processing unit that renders an image based on the time series data predicted by the prediction unit.

(14) An image processing device including:

a receiving unit that receives time series data from an external device;

a predicted time calculation unit that calculates a predicted time from the latest time of sending previously received data from the external device to a time when a next image is displayed;

a time series data prediction unit that predicts time series data at the predicted time; and a drawing processing unit that renders an image based on the time series data predicted by the prediction unit.

(15) An image processing method including:

a receiving step of receiving time series data from an external device;

a predicted time calculation step of calculating a predicted time from a time when the latest one of previously received data is generated in the external device to a time when a next image is displayed;

a time series data prediction step of predicting time series data at the predicted time; and a drawing processing step of rendering an image based on the time series data predicted in the prediction step.

(16) A computer program described in a computer-readable form so as to cause a computer to function as:

a receiving unit that receives time series data from an external device;

a predicted time calculation unit that calculates a predicted time from a time when the latest one of previously received data is generated in the external device to a time when a next image is displayed;

a time series data prediction unit that predicts time series data at the predicted time; and a drawing processing unit that renders an image based on the time series data predicted by the prediction unit.

(17) An image display system including:

an external device that sends time series data;

a drawing device that receives the time series data and renders an image; and a display device that displays the image rendered by the drawing device, wherein the drawing device predicts a predicted time from a time when the latest one of previously received data is generated in the external device to a time when a next image is displayed, predicts time series data at the predicted time, and renders the image based on the predicted time series data.

(18) The image display system according to the above-mentioned (17), wherein the external device is a tracking device that tracks a position or a posture of a part or all of a body of a user who observes a display image on the display unit, and sends posture information, and the drawing device renders, based on the received posture information, an image following a movement of a part or all of the body of the user.

(19) The image display system according to the above-mentioned (17), wherein the tracking device sends a quaternion representing a position or a posture of a part or all of a body of a user, and the drawing device predicts a quaternion ahead by the predicted time by extrapolating a portion ahead of two quaternions to perform a spherical linear interpolation on the two quaternions, and renders the image based on the predicted quaternion.

REFERENCE SIGNS LIST

100 Image display system
200 Head motion tracking device

201 Sensor unit
202 Posture angle operation unit
203 Sending unit
300 Drawing device
301 Receiving unit
302 Drawing processing unit
303 Sending unit
304 Image source
400 Display device
401 Receiving unit
402 Display unit
71 Variant delay estimation unit
72 Total delay amount calculation unit
73 Prediction unit

The invention claimed is:

1. An image processing device comprising:
a receiving unit that receives time series data from an external device via asynchronous communication;
a predicted time calculation unit that calculates a predicted time from a time when the latest one of previously received data is generated in the external device to a time when a next image is displayed, wherein a prior variation in time intervals between receipt of prior sequential pieces of the time series data by the image processing device is used to estimate a current variant transmission delay from the external device to the image processing device for sequential pieces of the time series data including a current piece of the time series data, and the variant transmission delay is used with a constant transmission delay to calculate the predicted time;
a time series data prediction unit that predicts time series data at the predicted time;
an image source; and
a drawing processing unit that generates a rendered image based on the time series data predicted by the prediction unit and image data from the image source.

2. The image processing device according to claim 1, wherein
the time series data prediction unit includes a configuration to interpolate between two pieces of time series data, and extrapolates a portion ahead of the two pieces of time series data to predict time series data ahead by the predicted time.

3. The image processing device according to claim 1, further comprising a sending unit that sends the rendered image to a display device.

4. The image processing device according to claim 1, further comprising a display unit that displays the rendered image.

5. The image processing device according to claim 1, wherein
the external device tracks a position or a posture of a part or all of a body of a user who observes an image,
the receiving unit receives, from the external device, posture information as the time series data, and
the drawing processing unit renders, based on the posture information, an image following a movement of a part or all of the body of the user.

6. The image processing device according to claim 5, wherein
the predicted time calculation unit calculates the predicted time based on a total delay amount from when the posture information is sent from the external device to when an image that is based on the posture information is displayed.

7. The image processing device according to claim 6, wherein
the total delay amount includes a transmission delay that occurs when the posture information is transmitted from the external device, a rendering delay that occurs when the image is rendered based on the posture information, and a display delay that occurs when the rendered image is displayed.

8. The image processing device according to claim 5, wherein
the receiving unit receives, from the external device, a quaternion representing the position or the posture of a part or all of the body of the user as the time series data.

9. The image processing device according to claim 8, wherein
the time series data prediction unit includes a configuration to perform a linear interpolation on two quaternions, and extrapolates a portion ahead of the two quaternions to predict a quaternion ahead by the predicted time.

10. The image processing device according to claim 8, wherein
the time series data prediction unit includes a configuration to perform a spherical linear interpolation on two quaternions, and extrapolates a portion ahead of the two quaternions to predict a quaternion ahead by the predicted time.

11. An image processing device comprising:
a receiving unit that receives time series data from an external device via asynchronous communication;
a predicted time calculation unit that calculates a predicted time from the latest time of sending previously received data from the external device to a time when a next image is displayed, wherein a prior variation in time intervals between receipt of prior sequential pieces of the time series data by the image processing device is used to estimate a current variant transmission delay from the external device to the image processing device for sequential pieces of the time series data including a current piece of the time series data, and the variant transmission delay is used with a constant transmission delay to calculate the predicted time;
a time series data prediction unit that predicts time series data at the predicted time;
an image source; and
a drawing processing unit that generates a rendered image based on the time series data predicted by the prediction unit and image data from the image source.

12. An image processing method comprising:
a receiving step of receiving time series data from an external device via asynchronous communication;
a predicted time calculation step of calculating a predicted time from a time when the latest one of previously received data is generated in the external device to a time when a next image is displayed, wherein a prior variation in time intervals between receipt of prior sequential pieces of the time series data is used to estimate a current variant transmission delay from the external device for sequential pieces of the time series data including a current piece of the time series data, and the variant transmission delay is used with a constant transmission delay to calculate the predicted time;
a time series data prediction step of predicting time series data at the predicted time; and a drawing processing step of generating a rendered image based on the time series data predicted in the prediction step and image data from an image source.

13. A non-transitory computer-readable medium having instructions stored thereon, the instructions configured to cause a computer to function as:
   a receiving unit that receives time series data from an external device via asynchronous communication;
   a predicted time calculation unit that calculates a predicted time from a time when the latest one of previously received data is generated in the external device to a time when a next image is displayed, wherein a variation in time intervals between receipt of prior sequential pieces of the time series data is used to estimate a current variant transmission delay from the external device for sequential pieces of the time series data including a current piece of the time series data, and the variant transmission delay is used with a constant transmission delay to calculate the predicted time;
   a time series data prediction unit that predicts time series data at the predicted time;
   an image source; and
   a drawing processing unit that generates a rendered image based on the time series data predicted by the prediction unit and image data from the image source.

14. An image display system comprising:
   an external device that sends time series data;
   a drawing device that receives the time series data via asynchronous communication and renders an image; and
   a display device that displays the image rendered by the drawing device, wherein
   the drawing device predicts a predicted time from a time when the latest one of previously received data is generated in the external device to a time when a next image is displayed, predicts time series data at the predicted time, and renders the image based on the predicted time series data and image data from an image source, wherein a variation in time intervals between receipt of prior sequential pieces of the time series data by the drawing device is used to estimate a current variant transmission delay from the external device to the drawing device for sequential pieces of the time series data including a current piece of the time series data, and the variant transmission delay is used with a constant transmission delay to calculate the predicted time.

15. The image display system according to claim 14, wherein
   the external device is a tracking device that tracks a posture of a part or all of a body of a user who observes a display image on the display unit, and sends posture information, and
   the drawing device renders, based on the received posture information, an image following a movement of a part or all of the body of the user.

16. The image display system according to claim 14, wherein
   the tracking device sends a quaternion representing a position or a posture of a part or all of a body of a user, and
   the drawing device predicts a quaternion ahead by the predicted time by extrapolating a portion ahead of two quaternions to perform a spherical linear interpolation on the two quaternions, and renders the image based on the predicted quaternion.

* * * * *